Jan. 17, 1928.  
S. P. MARLEY ET AL  
1,656,879  
DETONATION INDICATOR  
Filed Oct. 6, 1924

Fig. 1.

Fig. 2.

Inventors  
S. P. Marley and  
W. H. Gruse.  
By O. P. McElroy  
Attorney

Patented Jan. 17, 1928.

1,656,879

UNITED STATES PATENT OFFICE.

SAMUEL P. MARLEY, OF PITTSBURGH, AND WILLIAM A. GRUSE, OF WILKINSBURG, PENNSYLVANIA, ASSIGNORS TO GULF REFINING COMPANY, OF PITTSBURGH, PENNSYLVANIA, A CORPORATION OF TEXAS.

DETONATION INDICATOR.

Application filed October 6, 1924. Serial No. 741,929.

This invention relates to detonation indicators and it comprises a detonation indicator having means for resisting normal explosion pressures of a gas engine and means actuated by abnormal detonation explosion, such means comprising in one form of the invention, a cylinder provided with screw threads or the like for attaching the same to the cylinder of a gas engine in communication with the explosion chamber thereof, a piston in the indicator cylinder, means associated with the piston in the indicator cylinder for permitting such piston to resist the normal explosion pressure of the gas engine, means associated with the piston in the indicator cylinder for transmitting movement of the piston due to detonative explosion, and means in position to be actuated through the piston for indicating the movement thereof; all as more fully hereinafter set forth and as claimed.

It is desirable in the art to which this invention relates to provide means for metering, testing or comparing detonation in an explosive engine as contradistinguished from the regular pressures due to normal explosion, this being to enable comparison of the detonation or "knocking" of any given gasoline or fuel under varying conditions, of different gasoline or different fuels under standard conditions. As is well known, ordinary gasoline and kerosene will knock under abnormal pressures and under various other conditions, and it is desirable to have some basis of comparison in studying these conditions. Also, it is convenient to compare one fuel with another or the effects of various small additions to such fuel; of "anti-knock" compounds. It is the purpose of the present invention to provide such a meter. For this purpose there is mounted on an engine cylinder a special device composed of a cylinder with a piston carrying what may be termed a striker point. Mounted to engage with this striker point and to rest normally thereon is a pivoted anvil retained in position by a suitable tension spring. The striker point is provided with an adjustable head so that its length can be varied. By adjusting the length of the striker point and by having an anvil of sufficient weight, conditions can be so arranged that in the normal explosion in the cylinder, the anvil does not move to any extent. But with detonation and a more powerful explosion, the anvil is thrown out of position and its movement is indicated on a scale. By adjustment of the length of the striker point, there can be established a standard detonation—a detonation which, when it comes, will throw the indicator on the anvil to a given position on the scale. A greater detonation throws it farther and a lesser detonation, not so far.

In the accompanying drawings showing one form of a specific embodiment of our invention Fig. 1 is a vertical section through the detonator indicator and Fig. 2 is a top plan view thereof.

In the accompanying drawings in which similar reference characters are used in the two views to designate corresponding parts, an outer metal cylinder 1 is provided at its lower end with threads 2 for screwing into the motor cylinder block or head, and with a shoulder 3 under which a gasket may be placed to give a tight joint against the outer surface of the cylinder of the motor. The device is adapted for use in connection with gas engines, by which we mean engines of the external combustion type. Within the cylinder 1 and at its lower end is a closely fitting piston 4 carried by the pin or rod 5 and secured thereto by nut 6. This rod 5 extends up through the indicator cylinder and is secured at its upper end by the nuts 6' and 7. Resting above the piston 4 is a heavy coiled spring 8 which serves to resist the upward motion of the piston under impulse. The upper end of this spring is engaged against the lower end of the inner cylinder 9 which is concentric with the outer cylinder 1 and it encloses the rod 5. The upper end of cylinder 9 is threaded into the table piece 10 and the outer cylinder 1 is secured to the table piece by the union 11 which has screw threaded engagement with the lower offset threaded part of the table piece 10.

The upper end of the rod 5 carries a small machine screw 12 secured by lock nut 25, the head of such screw serving as a striker point or small hammer for the weight or anvil 13 mounted on one end of the indicator hand 14 which in turn is mounted on bearing 15 carried on dial plate 16. The movement of the indicator hand is restrained by helical spring 17 and its movement is measured on scale 18. The helical spring 17 may be adjusted on the arm 14 in the notches 19. The dial plate is secured to the table piece 10 by screws 20 and 21. A holding place for a wrench is provided in recess 22 of cylinder 1 which permits screwing the indicator into place.

The operation of the indicator is as follows: The lower end of the cylinder 1 is entered into an appropriate hole in the cylinder head of a gas engine with the gasket between shoulder 3 and the engine head. Such gasket should be of such a thickness that the lower end of the piston 4 is just flush with the inner gas engine cylinder wall. The pressure of the heavy spring 5 is so adjusted by means of spring nuts 6' and 7 that normal, non-detonating explosion in the cylinder of the internal combustion engine transmits no shock to the anvil 13 so that the indicator hand 14 does not move at all. The adjustment is such, however, that when by some means detonative explosion is induced in the cylinder the shock transmitted to anvil 13 is sufficient to cause it to be thrown off the resting point or hammer head 12. The light spiral spring 17 is also adjusted to give a suitable travel to the hand 14.

The small spiral spring 17 is so adjusted that it is under tension even when the anvil 13 is at rest. The motion of the anvil 13 is thus always restrained by the spring and as the extension of the spiral spring is, within its elastic limits, directly proportional to the force applied, the motion of the anvil, and consequently of the indicator hand, is always directly proportional to the momentum imparted by the shock of detonation.

For the sake of illustration the following may be mentioned as one use of the indicator with different fuels and fuel mixtures. If the springs have been so adjusted that the standard gasoline gives a detonation corresponding to a reading of 2 on the scale, then an admixture of 25 per cent of benzol in the fuel will reduce the detonation to that indicated by a reading of 1.2. The addition of 20 per cent of acetone causes similar reduction to a reading of 1, and the use of 2 per cent of anilin gives a reduction to a reading of .8. Among the advantages of the apparatus of this invention are the rugged construction, the complete replaceability of parts, the ease and rapidity of observation and the speed with which readings can be made of different fuels, thus insuring measurement while motor conditions remain unchanged. The heavy spiral spring 8 may be replaced by much heavier or lighter springs when operating conditions are to be varied. The solid piston ring may be replaced by one built up with piston rings when it is desired to avoid the slightest loss of compression, and other detail changes and modifications may be resorted to without departing from the spirit and scope of our invention. We advantageously construct the main parts of the indicator of cold rolled steel, the dial plate 16 of brass, the indicator hand of light hard steel, and the piston 4 of some metal softer than that used in the cylinder 1, such as bronze.

What we claim is:—

1. A detonation indicator comprising a cylinder, means for securing it to a gas engine cylinder, a piston in said indicator cylinder, adjustable means associated with the piston for resisting normal explosion pressure, means associated with the indicator piston for transmitting movement due to abnormal pressure, a hammer on said last mentioned means, an anvil normally resting on said hammer, an indicator associated with said anvil, and means for holding the anvil in proximity to the hammer.

2. A detonation indicator comprising a cylinder, means for securing the said cylinder to a gas engine cylinder, a piston in said indicator cylinder, means for holding said piston in said cylinder against substantial movement due to normal explosion pressure in said engine cylinder, said means comprising a spring and means for positioning it against said piston, a rod for said piston inside said indicator cylinder, adjustable means associated with said rod for engaging an anvil, an anvil normally resting against said last named means, means for adjustably holding said anvil against said means, an indicator hand associated with said anvil and a scale in proximity to the indicator hand, whereby the said anvil and thus said indicator hand is moved upon detonative explosion in the engine cylinder.

3. A pressure indicator for gas engines comprising a cylinder, means for attaching it to a gas engine, means in the cylinder adapted to be acted upon by the pressure in the engine, a rod connected to said means, means on the rod for engaging indicator means, an indicator means adapted to be operated by said rod means and comprising a weight loosely engaging the rod means and a hand carried by the weight.

4. A pressure indicator for gas engines comprising a cylinder, means for attaching it to a gas engine, means in the cylinder adapted to be acted upon by the pressure in the engine, a rod connected to said means, means on the rod for engaging indicator means, an indicator means adapted to be operated by said rod means and comprising a weight loosely engaging said rod means, an indicator hand associated with said weight, and means for adjusting the engagement of the said weight on said rod means.

5. In a detonation indicator for explosive engines, a cylinder casing adapted to be screwed into an engine cylinder, a piston therein having an adjustable head forming a striker point, a pivoted anvil mounted in operative relationship to said striker point, spring means for impeding movement of said anvil and scale means for indicating movement of said anvil.

In testimony whereof, we have hereunto affixed our signatures.

SAMUEL P. MARLEY.
WILLIAM A. GRUSE.